United States Patent [19]

Pittie et al.

[11] 4,067,952

[45] Jan. 10, 1978

[54] LEACHING OF COPPER-NICKEL CONCENTRATES

[75] Inventors: Willem H. Pittie, Roodepoort; Kingsley F. Doig, Hillbrow, both of South Africa

[73] Assignee: Anglo-Transvaal Consolidated Investment Company Limited, Johannesburg, South Africa

[21] Appl. No.: 609,813

[22] Filed: Sept. 2, 1975

[30] Foreign Application Priority Data

Sept. 6, 1974 South Africa .................. 745691

[51] Int. Cl.$^2$ .............. C01G 3/00; C01G 53/08; C25C 1/08
[52] U.S. Cl. ................... 423/37; 423/45; 423/140; 423/147; 423/150; 204/113
[58] Field of Search ............... 204/112, 113; 75/110, 75/114, 116, 119, 7; 423/37, 45, 140, 150, 147

[56] References Cited

U.S. PATENT DOCUMENTS

| | | | |
|---|---|---|---|
| 483,639 | 10/1892 | Strap | 423/150 |
| 940,292 | 11/1909 | Wells | 423/37 |
| 967,072 | 8/1910 | Shuler | 423/150 |
| 1,335,000 | 3/1920 | Hovland et al. | 423/37 |
| 2,094,277 | 9/1937 | Mitchell | 423/150 |
| 2,719,082 | 9/1955 | Sproule et al. | 75/7 |
| 2,943,929 | 7/1960 | Norman | 423/150 |
| 3,085,084 | 4/1963 | Thornhill | 423/139 |
| 3,896,208 | 7/1975 | Dubeck et al. | 423/150 |
| 3,909,248 | 9/1975 | Ryan et al. | 423/150 |

Primary Examiner—O. R. Vertiz
Assistant Examiner—Brian E. Hearn
Attorney, Agent, or Firm—Cushman, Darby & Cushman

[57] ABSTRACT

A process for the treatment of nickel-copper concentrates comprises the steps of leaching nickel selectively with a dilute hydrochloric acid solution, separating the leach solution from the residue, roasting the residue at a temperature sufficient to form at least about the stoichiometric quantity of sulphate to convert all the nickel present in the residue to nickel sulphate, leaching the roasted residue with water and precipitating any dissolved copper from the aqueous leach solution thus obtained.

8 Claims, 1 Drawing Figure

LEACHING OF COPPER-NICKEL CONCENTRATES

THIS INVENTION relates to the leaching and treatment of copper-nickel concentrates which are generally in the form of sulphide mattes.

The conventional process of dissolving nickel is to treat the calcined matte with spent nickel sulphate electrolyte which procedure is not very selective and which has the danger that some of the platinum group metals and gold present may be dissolved and thus lost or alternatively appear as an impurity in one of the products.

Probably the most successful method of treating such concentrates to date is by the Falconbridge matte leach process which is used on a commercial scale in Norway. This process involves the use of very strong hydrochloric acid (of the order of 275g/1 HCl) in order to selectively dissolve nickel and the nickel chloride is then removed by increasing the strength of the acid in order to cause nickel chloride to crystallize out of the leach solution. The nickel chloride is then treated with steam to regenerate HCl and the resultant nickel oxide is reduced with hydrogen gas to recover metallic nickel.

Residual copper is then roasted to the oxide and then treated by the conventional sulphate process. Clear separation of anions is thus required in view of the different systems used on nickel and copper.

If, however, nickel is to be recovered from the $NiCl_2$ solution by electrolyte deposition then, in order to provide an economic process the matte has to be leached with spent nickel chloride electrolyte which only contains 20 – 50g free HCl per liter.

This invention therefore provides a process for the treatment of nickel-copper concentrates using hydrochloric acid of relatively low concentrations and wherein a clear separation of chloride and sulphate anions is obtained.

In accordance with this invention there is provided a process for the treatment of nickel-copper concentrates comprising leaching nickel selectively with a dilute hydrochloric acid solution, separating the leach solution from the residue roasting the residue at a temperature sufficient to form at least about the stoichiometric quantity of sulphate to convert all the nickel present in the residue to nickel sulphate, leaching the roasted residue with water and precipitating any dissolved copper from the aqueous leach solution thus obtained.

Further features of the invention provide for the leaching to be effected under conditions of aeration, for the dissolved copper sulphate in the aqueous leach solution to be precipitated by means of hydrogen sulphide produced in the chloride leach step this precipitate being recycled to the roasting step and for the remaining nickel sulphate and free sulphuric acid in the aqueous leach solution to be neutralised by the addition of Calcium Carbonate whereafter the dissolved nickel sulphate is converted to carbonate by the addition of sodium carbonate or other suitable soluble carbonate (such as Magnesium carbonate or potassium carbonate) thereto.

Still further features of the invention provide two alternative procedures for removing any iron, cobalt and sulphate ions, in the chloride leach solution. The one procedure involves the oxidation at the natural pH of the leach solution (i.e. about pH 1) of at least some metals present in solution to higher oxidation states and the precipitation of these metals together with sulphate by the addition of nickel carbonate, the lime or calcium carbonate in order to adjust the pH of the solution to about 3.5. Under these conditions cobalt is not oxidized and remains in solution whilst iron (ferric) and sulphate precipitate out. The solution is then again oxidized at pH 3.5 with chlorine gas whereupon the cobalt oxidizes and precipitates out, the pH of the solution during this process being maintained at about 3.5 by the addition of alkali, preferably calcium carbonate.

The other procedure involves the initial adjustment of the pH to about 3.5 followed by oxidation whereupon the iron, cobalt and sulphate precipitate together. As in the first case nickel carbonate and calcium carbonate were added to adjust the pH as required.

The hydrochloric acid used as the leaching agent will in general be a spent nickel chloride electrolyte but in any event will preferably have from about 20 to 50 grams/liter of free HCl, the particular concentration being dependant on the economics of the electrolysis process.

The roasting step is performed in general at between 300° and 600° C (preferably 400° C) and the time for which roasting is effected has been found to be of the order of 2 hours. This roasting is effected in a large excess of air.

It is uncertain whether nickel sulphate is formed directly in the roast or of subsequent leaching with water initially dissolves copper sulphate which then converts nickel oxide to soluble nickel sulphate with the copper then precipitating again as the hydroxide.

Care must be taken in the roasting step not to form too much sulphate which is controlled mainly by the temperature of the roast. If too much sulphate is formed the associated copper, when precipitated using $H_2S$ will result in an accumulation of copper sulphate in the circuit where the precipitated CuS is recycled to the roasting step. The reason for this is that CuS is easily oxidized to sulphate. However, the CuS could be treated in another manner to avoid this. Also, formation of excess copper sulphate leads to increased acid formation during its precipitation with $H_2S$ thereby increasing the requirement for alkali to effect neutralization thereof.

BRIEF DESCRIPTION OF THE DRAWING

The above and other feature of the invention will be more fully understood from the following description of a process embodying the invention. In this description reference will be made to the accompanying flow sheet, FIG. 1.

In the process outlined below a sulphide matte having the following composition was tested:

Figure 1:
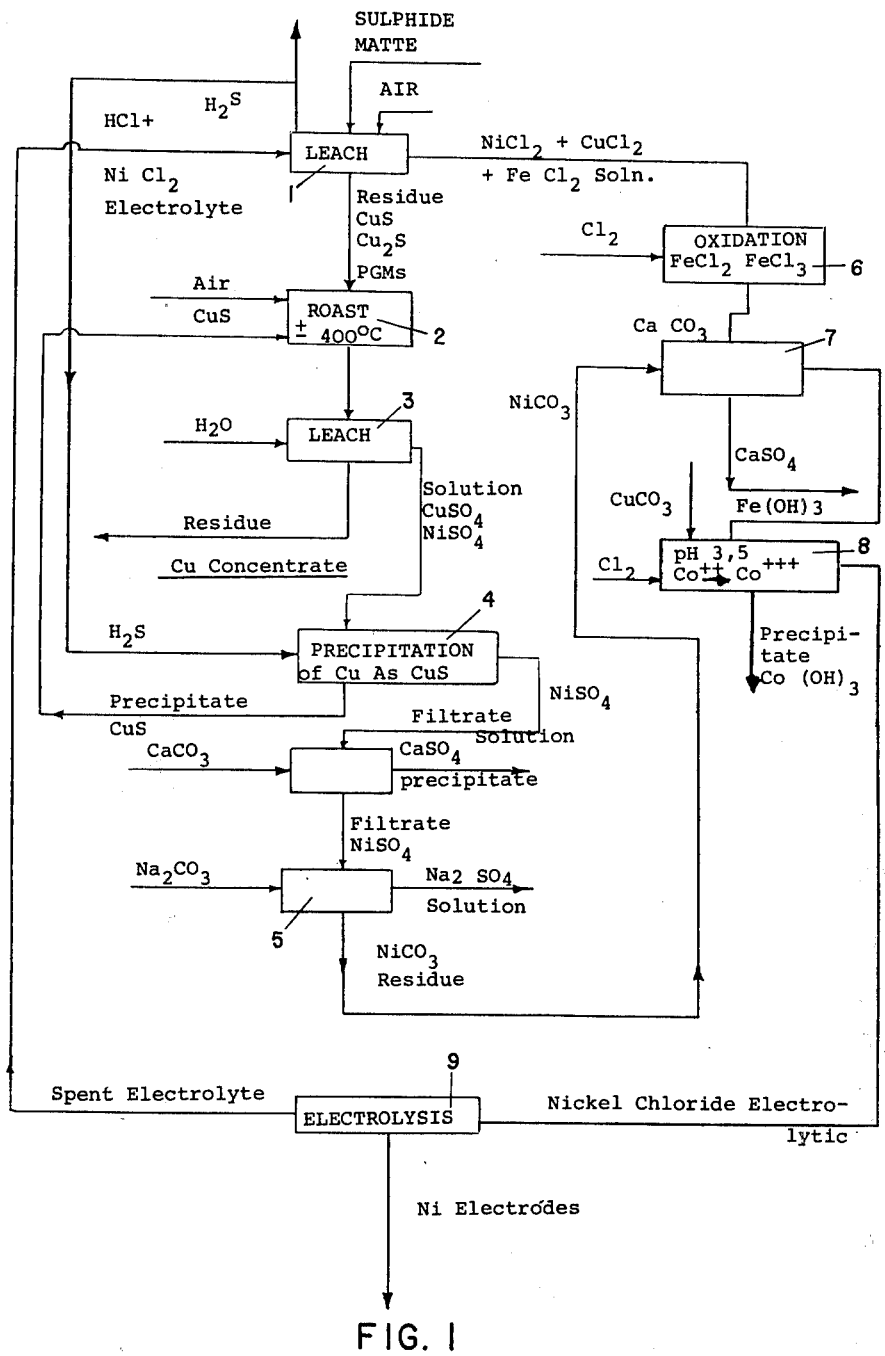

| Nickel | 46.4% |
|---|---|
| Copper | 26.4% |
| Iron | 3.2% |
| Sulphur | 22.5% |
| Cobalt | 0.3% |

The composition of the spent nickel chloride electrolyte used as leaching agent was as follows:

| Nickel | 50g/l |
|---|---|
| Free HCl | 32g/l |
| $H_2SO_4$ | 3g/l |
| NaCl | 45g/l |

Various tests were firstly carried out to ascertain the leaching efficiency. In each test a quantity of matte was treated with the volume of spent nickel chloride electrolyte (hereinafter termed leaching agent) containing the stochiometric quantity of free HCl required to dissolve all the nickel present. It was found that when the reaction mass was aerated, 95 – 97% of the nickel was dissolved. Subsequent tests indicate that nickel dissolution was better with aeration of the reaction mass. The results were obtained when leaching was effected at 90° C for a period of about 16 hours. Of course other temperatures could be used with the time being adjusted accordingly.

Thus effective leaching can be obtained using a spent nickel chloride electrolyte in conjunction with aeration which is a feature of the invention. This step is indicated by numeral 1 in the flow sheet.

In the process the residue from the leach step was roasted at 400° C in excess air (step 2) which was found to result in a 10–20% gain in weight due to sulphate formation.

In order to recover most of the nickel remaining and to dissolve any residual chloride the roasted residue is subjected to an aqueous leach step 3 at about 50° C. The residue from this leach step forms the feed to a copper recovery step and contains the platinum group metals and gold from the matte. This leach step was found to increase the overall recovery of Nickel to more than 99%.

The aqueous leach liquor is treated with part of the hydrogen sulphide produced in the chloride leach step to precipitate any dissolved copper sulphate as CuS and this precipitate was recycled to the roasting step 2. This precipitation is shown as step 4 in the flow sheet.

The aqueous leach liquor which contained free sulphuric acid is neutralized with calcium carbonate and the resultant calcium sulphate was filtered off.

The dissolved nickel sulphate in the remaining aqueous solution is then converted to nickel carbonate at 5 by the addition of sodium carbonate whereupon the nickel carbonate precipitates out and is used as indicated below.

The original chloride leach liquor is firstly treated at 6 with chlorine gas to raise the oxidation state of the dissolved iron. The above mentioned nickel carbonate is then added to the solution together with calcium carbonate sufficient to raise the pH to 3.5 (at 7) whereupon the iron and sulphate precipitate out as Fe(OH)$_3$ and CaSO$_4$ and the nickel introduced as the carbonate is converted to the chloride.

The filtrate is then chlorinated again (at 8) and the pH of 3.5 maintained by calcium carbonate additions whereupon the cobalt present precipitates out as the cobaltic hydroxide and the nickel chloride solution is then ready for use in an electrolytic cell 9. The spent electrolyte would then be recycled to the leaching step.

Alternatively the cobalt, iron and sulphate may all be precipitated together by raising the pH to 3.5 prior to any oxidation as outlined above.

It is considered that the process provided by this invention will result in a good and economical process for producing a nickel chloride solution from a nickel-copper matte and which is suitable for electrolysis wherein a good separation of the different anions is obtained by use of the aqueous leach step. High recoveries of nickel and low losses of platinum group metals are expected as outlined above. Also, in the tests conducted the platinum group metals and gold dissolved in the chloride leach step were below detection limits.

What we claim as new and desire to secure by Letters Patent is:

1. A process for the treatment of concentrated nickel-copper sulphide matte comprising the successive step of:
    1. leaching nickel with a dilute solution of hydrochloric acid, the hydrochloric acid solution containing about 20 to about 50 grams per liter of hydrogen chloride therein, the dilute hydrochloric acid solution containing the stoichiometric quantity of free HCl therein relative to the nickel content of said matte to dissolve all the nickel present in said matte;
    2. separating the leach solution containing all of the thus-dissolved nickel therein from the residue;
    3. roasting the residue separated in step (2) is an excess of air at a temperature of about 300 to 600° C for a time sufficient to convert all the nickel present in said residue to nickel sulphate;
    4. leaching the roasted residue of step (3) with water to dissolve soluble sulphates contained in the roasted residue;
    5. separating the aqueous leach liquor containing the sulphates therein from the residue;
    6. treating the thus separated aqueous leach liquor with hydrogen sulphide from the dilute hydrochloric acid leach step (1) to precipitate any dissolved copper contained in the aqueous leach liquor;
    7. neutralizing the sulphuric acid contained in the thus separated aqueous leach liquor of step (6) with calcium carbonate, thereby forming solid calcium sulphate and a nickel-containing aqueous solution;
    8. treating the nickel-contaning aqueous solution of step (7) with sodium carbonate thereby converting the nickel sulphate dissolved therein to a precipitate of nickel carbonate;
    9. combining the leach solution of step (2), after preliminary treatment with chlorine to raise the oxidation state of iron dissolved therein to +3, with the nickel carbonate of step (8) in the presence of lime or calcium carbonate thereby:
        a. precipitating the iron and sulphate contained therein as Fe(OH)$_3$ and CaSO$_4$, and
        b. converting the nickel carbonate to a solution of nickel chloride;
    10. separating the precipitate (a) and chlorinating the nickel chloride solution in the presence of calcium carbonate to precipitate any cobalt present as cobaltic hydroxide; and
    11. removing the cobaltic hydroxide precipitate and passing the resulting nickel chloride solution to an electrolytic cell.

2. A process for the treatment of nickel-copper concentrate comprising the successive steps of:
    a. leaching the nickel-copper concentrate with a hydrochloric acid-containing solution, wherein the hydrogen chloride content is about 20 to about 50 grams per liter and wherein the volume of the hydrochloric acid-containing solution contains substantially the stoichiometric quantity of free hydrogen chloride which would be required to dissolve all the nickel present in said concentrate;
    b. separating the chloride leach solution containing dissolved nickel therein from the residue;
    c. roasting the residue separated in step (b) in an excess of air at a temperature of about 300° to 600°

C. for a time sufficient to convert substantially all of the nickel remaining in such residue to nickel sulphate;

d. leaching the roasted residue to step (c) with water to dissolve nickel sulphate and any copper sulphate which may have been formed in said residue;

e. treating the aqueous leach liquor produced in step (d) to selectively precipitate any dissolved copper therein;

f. subsequently neutralizing the acidic aqueous leach liquor produced in step (e);

g. treating the neutralized aqueous leach liquor of step (f) to precipitate nickel carbonate; and h. combining the nickel carbonate precipitate of step (g) in the presence of lime or calcium carbonate with the chloride leach liquor of step (b) after said chloride leach liquor has been treated to oxidize iron dissolved therein to the +3 oxidation state, whereby:
  i. iron and sulphate are precipitated and,
  ii. the nickel carbonate is converted to nickel chloride which dissolves in the chloride leach liquor to provide a nickel chloride electrolyte suitable for the electrolytic recovery of nickel therefrom.

3. A process as claimed in claim 2 in which step (e) is carried out by treating the aqueous leach liquor with hydrogen sulphide to precipitate copper as copper sulphide.

4. A process as claimed in claim 2 in which step (f) is carried out using calcium carbonate to effect neutralization and the thus precipitated calcium sulphate is separated from the aqueous leach liquor prior to performing step (g) thereon.

5. A process as claimed in claim 2 in which step (g) is carried out by adding sodium carbonate to precipitate nickel carbonate.

6. A process as claimed in claim 2 in which the nickel chloride electrolyte is, prior to the electrolytic recovery of nickel therefrom, subjected to the additional steps of:
  i. chlorination of the nickel chloride electrolyte in the presence of calcium carbonate to precipitate any cobalt present as cobaltic hydroxide; and
  j. removing the precipitated cobaltic hydroxide from the nickel chloride electrolyte.

7. A process as claimed in claim 2 in which the oxidation of iron to the +3 oxidation state as referred to in step (h) is effected by means of chlorine.

8. A process as claimed in claim 2 in which the leach of step (a) is conducted at elevated temperature with aeration.

* * * * *